(12) United States Patent
Bauer et al.

(10) Patent No.: US 7,138,190 B2
(45) Date of Patent: Nov. 21, 2006

(54) COMPOSITE CONTAINING REINFORCING FIBERS COMPRISING CARBON

(75) Inventors: Moritz Bauer, Augsburg (DE); Martin Christ, Wehringen (DE); Ronald Huener, Baar (DE); Andreas Kienzle, Thierhaupten (DE); Rainer Zimmermann-Chopin, Ellgau (DE)

(73) Assignee: SGL Carbon AG (DE)

( * ) Notice: Subject to any disclaimer, the term of this patent is extended or adjusted under 35 U.S.C. 154(b) by 215 days.

(21) Appl. No.: 10/391,868

(22) Filed: Mar. 19, 2003

(65) Prior Publication Data

US 2003/0180527 A1   Sep. 25, 2003

(30) Foreign Application Priority Data

Mar. 21, 2002   (DE) ................. 102 12 486

(51) Int. Cl.
*B32B 5/02* (2006.01)
*B32B 15/14* (2006.01)
*B32B 15/20* (2006.01)

(52) U.S. Cl. .............. 428/674; 428/549; 428/553; 428/539.5; 428/627; 428/614; 427/404; 427/419.1

(58) Field of Classification Search ............. 428/674, 428/549, 553, 539.5, 627, 614; 427/404, 427/419.1
See application file for complete search history.

(56) References Cited

U.S. PATENT DOCUMENTS

| | | | | |
|---|---|---|---|---|
| 3,720,257 A | * | 3/1973 | Beutler et al. ............... 164/75 |
| 4,747,873 A | * | 5/1988 | Kamioka ................... 75/229 |
| 5,509,555 A | * | 4/1996 | Chiang et al. ............... 216/56 |
| 5,876,659 A | * | 3/1999 | Yasutomi et al. ............ 264/638 |
| 6,183,667 B1 | * | 2/2001 | Kubo et al. ................. 252/503 |
| 6,231,791 B1 | * | 5/2001 | Heine et al. ................ 264/29.5 |
| 6,248,269 B1 | * | 6/2001 | Dietrich et al. ............. 264/29.5 |
| 6,261,981 B1 | * | 7/2001 | Dietrich et al. ............. 501/95.2 |
| 6,265,071 B1 | * | 7/2001 | Gross et al. ................ 428/408 |
| 6,555,173 B1 | * | 4/2003 | Forsythe et al. ........... 427/376.2 |
| 6,793,873 B1 | * | 9/2004 | Gadow et al. .............. 264/646 |
| 6,818,288 B1 | * | 11/2004 | Bauer et al. ............. 428/293.4 |
| 2001/0051258 A1 | | 12/2001 | Hanzawa et al. |
| 2003/0057040 A1 | * | 3/2003 | Bauer et al. |
| 2004/0142518 A1 | * | 7/2004 | Yu et al. ..................... 438/197 |

FOREIGN PATENT DOCUMENTS

| | | |
|---|---|---|
| DE | 37 31 540 A1 | 3/1989 |
| DE | 196 42 506 C1 | 10/1997 |
| DE | 197 10 105 A1 | 9/1998 |
| DE | 197 27 585 A1 | 2/1999 |
| DE | 197 27 586 A1 | 2/1999 |
| EP | 0 634 494 A2 | 1/1995 |
| EP | 1 079 137 A1 | 2/2001 |
| EP | 1 084 997 A2 | 3/2001 |
| EP | 1 273 818 A1 | 1/2003 |
| JP | 05-186276 * | 7/1993 |
| WO | 01/08920 * | 2/2001 |
| WO | WO 02/051771 A1 | 7/2002 |

OTHER PUBLICATIONS

English Abstract DE 19642506, Jaehrig et al, Oct. 1997.*

* cited by examiner

*Primary Examiner*—Jennifer C. McNeil
*Assistant Examiner*—Jason L. Savage
(74) *Attorney, Agent, or Firm*—Connolly Bove Lodge & Hutz LLP

(57) ABSTRACT

Composite which contains reinforcing fibers comprising carbon and whose matrix comprises silicon carbide, silicon and copper, with the mass fraction of copper in the composite being up to 55%, processes for producing it, in particular by liquid infiltration of C/C intermediate bodies with melts comprising Si and/or Cu and Si, and also its use as friction lining in a friction pairing with ceramic brake discs or clutch discs comprising C/SiC.

22 Claims, No Drawings

COMPOSITE CONTAINING REINFORCING FIBERS COMPRISING CARBON

FIELD OF THE INVENTION

The invention relates to a composite containing reinforcing fibers comprising carbon. This composite comprises, in its matrix, phases of silicon carbide, silicon and copper and is suitable as friction partner for fiber-reinforced ceramic counterbodies, in particular bodies made of the material system C/SiC. The invention further relates to a process for producing this composite, in particular by liquid infiltration of C/C intermediate bodies by Si- and Cu-containing melts, and to the use of this composite as friction material in friction pairings with ceramic brake discs or clutch discs made of C/SiC.

BACKGROUND OF THE INVENTION

In the search for suitable friction materials for high-performance brake systems using ceramic friction bodies, the conventional organically bound friction materials reach their limits because of the high temperatures and high wear rates which occur. This becomes particularly apparent in the case of friction pairings in which C/SiC or C/C—SiC is used as brake disc material. These materials are ceramics formed essentially of SiC and secondary phases comprising Si and C, which is reinforced with carbon fibers, for example as described in DEA 197 10 105. During braking, temperatures around and above 1000° C. occur at the friction surface, and organically bound brake linings consequently decompose.

In EP-A 1 079 137, a sintered metal material is proposed for brake linings which, in combination with C/C-SiC brake discs, leads to an increased operating life and improved frictional behavior and consists of a sintered copper material having a mass fraction of more than 60% of copper. However, inter alia, the high-temperature strength required for ceramic friction partners is restricted by the high copper content and the binder phase.

In DE-A 197 27 586, it is proposed to use a combination of a C/SiC brake disc and a corresponding C/SiC brake lining. The C/C intermediate body for the brake disc has a density which is lower than that of the surface regions of the C/C intermediate body for the brake lining. This leads to a C/SiC having a relatively low strength being formed after the liquid silicization of the C/C intermediate body for the lining. However, the overall frictional and wear behavior, the performance when wet and in particular the comfort characteristics, including constant coefficients of friction and low noise, are not yet satisfactory.

In view of this prior art, it is an object of the invention to provide a friction material which withstands the high temperatures during braking without suffering damage and displays improved comfort characteristics in combination with ceramic counterbodies. In particular, the friction material should be matched to the combination with C/SiC brake discs.

SUMMARY OF THE INVENTION

According to the invention, this object is achieved by a composite which is reinforced with carbon fibers and whose matrix comprises silicon carbide, silicon and optionally carbon, together with copper. In this composite, copper is present in elemental form or as alloy predominantly as precipitates or as Cu-rich phase within the matrix of the C/SiC composite.

The invention accordingly provides a composite suitable as friction material which contains reinforcing fibers comprising carbon and whose matrix comprises silicon carbide, silicon and copper, with the mass fraction of copper in the composite being up to 55%.

The matrix of the composite can further comprise carbon.

Compared to the prior art, this friction material for the first time combines the good high-temperature and friction properties of C/SiC and the ability of Cu to modify the coefficient of friction while at the same time obtaining a homogeneous material which is stable at high temperatures.

DETAILED DESCRIPTION OF THE PREFERRED EMBODIMENTS

The mass fraction of copper in the composite is preferably in the range from 10 to 50% and particularly preferably in the range from 15 to 45%.

The copper in the matrix is preferably present in isolated copper-containing regions, with the copper-containing phases not forming a continuous phase but the individual copper-containing regions instead being surrounded completely by other phases, in particular phases comprising silicon carbide. Such noncontiguous copper-containing regions are referred to as "discrete phases".

The volume fraction of discrete, copper-containing phases in the composite is preferably up to 25%, based on the volume of the composite.

The copper-containing phases preferably comprise not only copper but also further metals which form mixed phases with copper. Preference is given to the metals zinc, tin, lead and aluminum which may be present individually or in admixture. The mass fraction of these metals, based on the sum of the masses of copper and these metals, is up to 25%.

Copper is already known as additive in brake linings to alter the coefficient of friction or the thermal conductivity, in particular in combination with brake discs made of gray cast iron or steel. However, these lining compositions are organically bound linings or sintered metal linings which are decomposed at temperatures around or above about 1000° C., with the copper even melting and destroying the lining.

Although the friction lining of the invention also contains copper in elemental form or in the form of its alloys whose melting points can be reached or exceeded at the use temperatures, surprisingly no destruction of the composite due to melting takes place. This is probably attributable, inter alia, to the microstructure of the material in which Cu is embedded in the SiC-containing matrix.

Apart from the copper-containing phases and silicon carbide, other carbides can also be present in the matrix. Particular preference is given to carbides of boron, titanium, zirconium, hafnium, vanadium, chromium, molybdenum, tungsten, iron, cobalt and nickel. Furthermore, the matrix can further comprise silicides of the abovementioned elements. It is also possible for these elements to be present as metallic phases in the matrix. The mass fraction of these elements and their carbides and silicides is preferably up to 20% of the mass of the matrix.

Preference is also given to a composite further comprising preformed particulate additives which are added in the production of the C/C composite and form separate phases in the composite. Preferred particulate additives are silicon carbide, silicon nitride, titanium carbide, aluminum oxide (corundum), zirconium dioxide, silicon dioxide and zirconium silicate. These particulate additives are preferably used in such amounts that their mass fraction is up to 15% of the mass of the matrix.

The invention further provides a process for producing such friction materials, which comprises the steps
production of a porous carbon/carbon composite (C/C or CFRC (=carbon fiber reinforced carbon) body, i.e. a body whose matrix consists essentially of carbon and which is reinforced with carbon fibers and is porous,
melt infiltration of the porous C/C body with a metal melt comprising silicon and copper,
reaction of at least part of the carbon of the C/C body with the silicon of the melt to form silicon carbide.

The metal melt used comprises not only silicon and copper but generally also small amounts, typically from 0.1 to 5%, of further metals.

The C/C body is produced by known methods and preferably contains coated short carbon fibers or fiber bundles as reinforcing fibers. The C/C body has to have open pores which allow access of the metal melt into the interior of the body. According to the invention, the porosity measured as the volume of pores as a proportion of the total volume of the body is at least 10% and preferably at least 18%. The preferred density of the C/C body is not more than 1.6 g/cm$^3$, preferably in the range from about 1 to 1.5 g/cm$^3$.

In the process of the invention, it is preferred that the C/C body itself contains further particulate additives for the friction material, in particular grains of hard material or sintered metal particles. As hard material additives, preference is given to using carbides or oxides in mass fractions of up to about 15%, preferably up to 15% and particularly preferably from 1 to 13%, with their melting point advantageously being above the melting point of silicon. Typical representatives of such hard material additives are silicon carbide, silicon nitride, titanium carbide, aluminum oxide (corundum), zirconium dioxide, silicon dioxide and zirconium silicate.

In a further advantageous embodiment of the process of the invention, metallic copper or its alloys with mass fractions of up to 25%, preferably from 1 to 20% and particularly preferably from 2 to 15%, of other metals is introduced into the C/C body itself, since this allows the proportion of copper to be introduced via the melt to be reduced. Here, the copper or its alloys is preferably introduced in the form of powder or turnings. In the extreme case, it is even possible for the introduction of copper from the outside via the melt to be omitted entirely, so that only a silicon melt is used for infiltration.

The introduction of copper or copper-containing alloys is preferably carried out by introducing copper powder or copper turnings or powder or turnings of copper-containing alloys into a shaped thermoset body reinforced with carbon fibers (CFRP body) which is carbonized in a known manner on heating in the absence of oxygen to temperatures in the range from about 800 to about 950° C. The shaped thermoset body preferably comprises polymers giving a high carbon yield, e.g. phenolic resins, furan resins, epoxy resins or polyimides, as carbonizable material. Any hard material additives or sintered metal particles used are preferably also introduced into the CFRP body.

Melt infiltration is usually carried out at temperatures of at least 1450° C. under atmospheric pressure or reduced pressure, under protective gas or in vacuo. As metal melts, use is made of Cu/Si melts in which further elements, in particular carbide-forming elements, can be present, in which case these are then coinfiltrated. Preference is given to using boron and, as further metals, Ti, V, Cr, Mo, W, Fe, Co and Ni or mixtures of two or more of these elements in mass fractions of up to about 20%, particularly preferably from 1 to 20% and in particular from 2 to 15%, in the melt.

This group of metals has, in particular, the task of favorably influencing the reactivity of the silicon toward the carbon of the C/C body and the oxidation behavior of the friction material at high use temperatures. Under the conditions of the infiltration and reaction, carbides and silicides of these elements are formed, in addition to unreacted residues of the additives.

The metal melt is preferably supplied via porous wicks of carbon-containing material and/or via beds of metal particles. A mixture of powder or granules of the individual metal components Si and Cu is typically used for this purpose.

It is not necessary for the Si/Cu alloy corresponding to the desired Si/Cu ratio to be produced beforehand, since the Si and Cu powders or granules combine on thermal treatment to give a joint melt. However, it can be advantageous to use previously produced, finished alloys since melting them generally requires significantly lower temperatures. This makes the melt infiltration process technically simpler. A significant advantage of the use of previously produced alloys for infiltration is that the copper melt, which generally has poor wetting properties, is taken up into the capillaries and pores of the C/C body without application of external pressure with the aid of the silicon which is the main constituent of the melt and has very good wetting properties. This advantage becomes clear in comparison with, for example, the process described in DE-A 37 31 540. Here, a friction material comprising C/C with Cu-filled pores is produced. Cu is forced under pressure into the continuous pores. Closed pores in the C/C body cannot be filled in this way.

In the filling of the pores, too, the process of the invention displays significant advantages, since the closed pores can also be filled by melt in this way. This is achieved by part of the carbon of the C/C body being consumed by the reaction with silicon, which can result in closed pore channels being opened. Copper can then also enter the previously closed pores together with the silicon. The liquid infiltration process using copper-containing silicon melts leads to a typical microstructure of Cu phases or precipitates surrounded by SiC and/or Si. In particular, Cu phases or precipitates which no longer touch the surface of the composite but are enclosed by the surrounding C/SiC material are formed. In a further advantageous embodiment of the invention, a Cu alloy in place of Cu is used in admixture with silicon for the infiltration. As alloy constituents, preference is given to the metals zinc, tin, lead and aluminum which are preferably present in mass fractions of up to 25%.

The volume fraction of Cu phases or Cu alloy phases in the composite is preferably up to 25%, particularly preferably up to 22% and in particular from 5 to 20%. This volume fraction refers to those phases which consist essentially of Cu (in an amount of at least 30% of their mass).

In the infiltration of the C/C body with silicon and the reaction of the carbon with the silicon to form silicon carbide, the carbon fibers are also attacked, at least on their surface. In this way, the fibers are coated with a layer of silicon carbide. Preference is given to the carbon fibers not having any direct contact with a copper-containing phase, but the carbon fibers and the copper-containing phases instead being separated from one another by, at least, a thin silicon carbide layer formed in this way.

The composite of the invention is particularly useful as friction material for friction pairings with counterbodies in which at least the friction surface is made of hard ceramic material. It is preferably used in friction pairings with counterbodies of composite ceramic reinforced with carbon fibers and having an SiC-containing matrix, particularly preferably C/SiC ceramic. The composite of the invention is particularly advantageous in brake linings for ceramic brake discs which have a mass fraction of silicon carbide of at least 60% in the zone facing the brake lining.

The invention claimed is:

1. A composite which contains coated reinforcing fibers comprising carbon and whose matrix comprises silicon carbide, silicon and copper and in which composite the mass fraction of copper is from 10% up to 55%, wherein isolated copper-containing regions are present which are surrounded completely by other phases, the volume fraction of the said isolated copper-containing regions in the composite being from 5% to 25%, wherein the material of the said isolated copper-containing regions is selected from the group consisting of alloys of copper with further metals which form-mixed phases with copper, these metals being selected from the group consisting of zinc, tin, and lead, the mass fraction of the said further metals in the mass of copper and the said further metals being from 1% to 25%.

2. The composite as claimed in claim 1, wherein the copper in the matrix is present in isolated copper-containing regions which are completely surrounded by phases comprising silicon carbide.

3. The composite as claimed in claim 1, wherein the volume fraction of the copper-containing regions in the composite is up to 22%, based on the volume of the composite.

4. The composite as claimed in claim 1, wherein the matrix further comprises elements selected from the group consisting of boron, titanium, zirconium, vanadium, chromium, tungsten, iron, cobalt and nickel in a form selected from the group consisting of its elementary form, the form of its carbide, and the form of its silicide.

5. The composite as claimed in claim 4, wherein the sum of the mass fractions of these said elements, their carbides and silicides is up to 20% of the mass of the matrix.

6. The composite as claimed in claim 1 which further comprises preformed particulate additives which form separate phases in the composite.

7. The composite as claimed in claim 6, wherein the particulate additives are selected from the group consisting of silicon carbide, silicon nitride, titanium carbide, aluminum oxide, zirconium dioxide, silicon dioxide and zirconium silicate.

8. The composite as claimed in claim 6, wherein the mass fraction of the particulate additives is up to 15% of the mass of the matrix.

9. A process for producing composites as claimed in claim 1, which comprises the steps
production of a porous carbon/carbon composite containing coated carbon fibers,
melt infiltration of the porous C/C body with a metal melt comprising silicon and copper, wherein copper is present in the melt in such an amount that copper is present in the composite in a mass fraction of from 10% to 55%, and further metals selected from the group consisting of zinc, tin, and lead are present in the composite in such amount that the mass fraction of the said further metals in the mass of copper and the said further metals is from 1% up to 25%,
reaction of at least part of the carbon of the C/C body with the silicon of the melt to form silicon carbide.

10. The process as claimed in claim 9, wherein the metal melt used comprises silicon and copper together with a mass fraction comprised in the metal melt of from 1% to 20% of further elements selected from the group consisting of boron, titanium, vanadium, chromium, iron, cobalt, and nickel.

11. The process as claimed in claim 9, wherein the C/C body prior to infiltration has a pore volume of at least 10% of the total volume of the body and a density of not more than 1.6 g/cm$^3$.

12. The process as claimed in claim 9, wherein the C/C body prior to infiltration contains further particulate additives selected from the group consisting of grains of hard material and sintered metal particles.

13. The process as claimed in claim 12, wherein carbides or oxides having melting points above the melting point of silicon are used in mass fractions, with relation to the mass of the matrix, of up to about 15% as hard material additives.

14. The process as claimed in claim 9, wherein metallic copper or its alloys with mass fractions of up to 25% of other metals is/are introduced into the C/C body itself, wherein the mass fraction is based on the sum of masses of copper and the said further metals.

15. The process as claimed in claim 14, wherein the copper or its alloys are introduced in the form of powder or turnings.

16. The process as claimed in claim 9, wherein the metal melt used is a Cu/Si melt which further comprises additional carbide-forming elements selected from the group consisting of boron, titanium, vanadium, chromium, tungsten, iron, cobalt and nickel in mass fractions of from 1% to 15% of the melt.

17. The process as claimed in claim 9, wherein the metal melt is supplied via porous wicks made of carbon-containing material and/or via beds of metal particles.

18. The process as claimed in claim 9, wherein previously produced, finished alloys of Cu and Si are used for infiltration.

19. A process for producing composites as claimed in claim 1, which comprises the steps
production of a porous carbon/carbon composite containing coated carbon fibers and copper,
melt infiltration of the porous C/C body with a silicon melt,
reaction of at least part of the carbon of the C/C body with the silicon of the melt to form silicon carbide.

20. A method of use of a composite as claimed in claim 1 in friction pairings with counterbodies having a friction surface in which at least the said friction surface is made of hard ceramic material, comprising combining the composite of claim 1 in the form of a friction pad with the said friction surface.

21. The method of use as claimed in claim 20 wherein the friction surface of the counterbody is the surface of a composite ceramic reinforced with carbon fibers and having an SiC-containing matrix.

22. The method of use as claimed in claim 21 wherein the friction surface of the counterbody is the surface of a ceramic brake disc which has a mass fraction of silicon carbide of at least 60% in the zone facing the composite of claim 1 in the form of a brake lining.

* * * * *